Oct. 20, 1931.  F. W. DOUTHITT  1,828,648
CUTTER HEAD FOR CORN CUTTING MACHINES
Filed Sept. 18, 1929  3 Sheets-Sheet 1
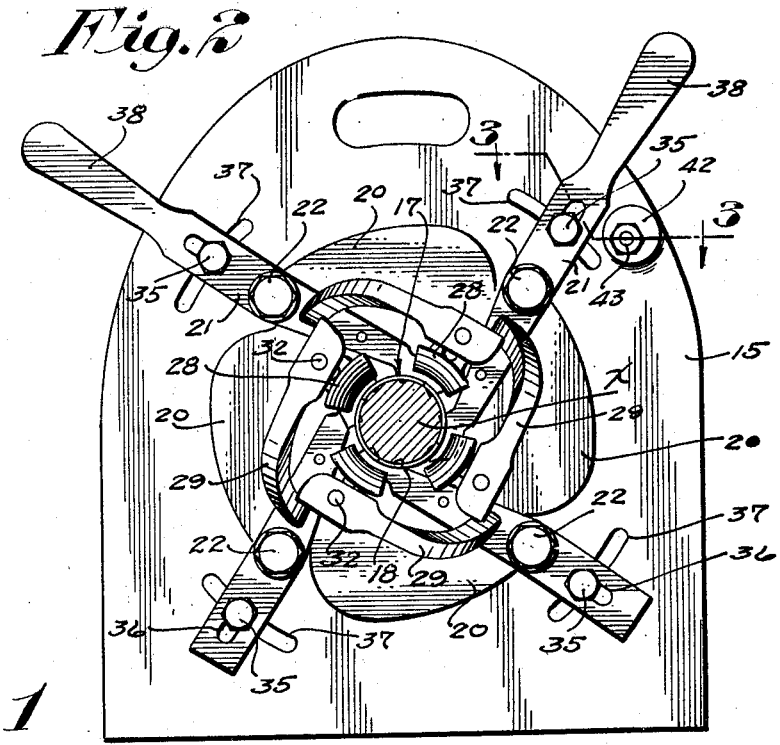
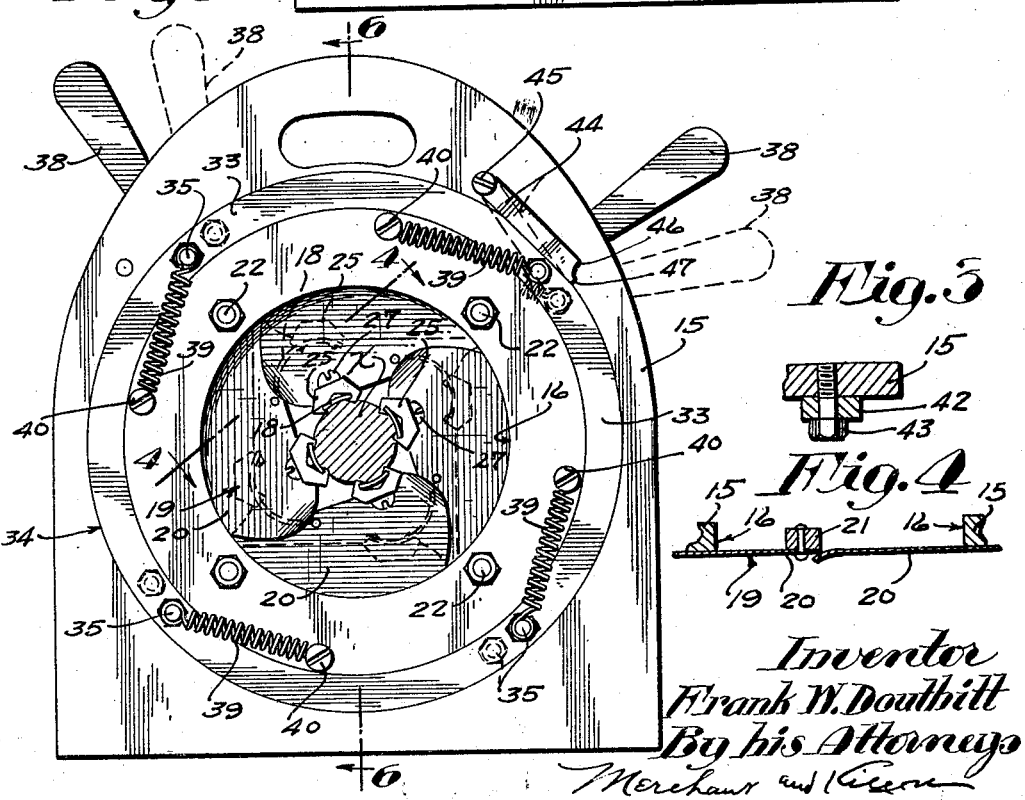
Inventor
Frank W. Douthitt
By his Attorneys

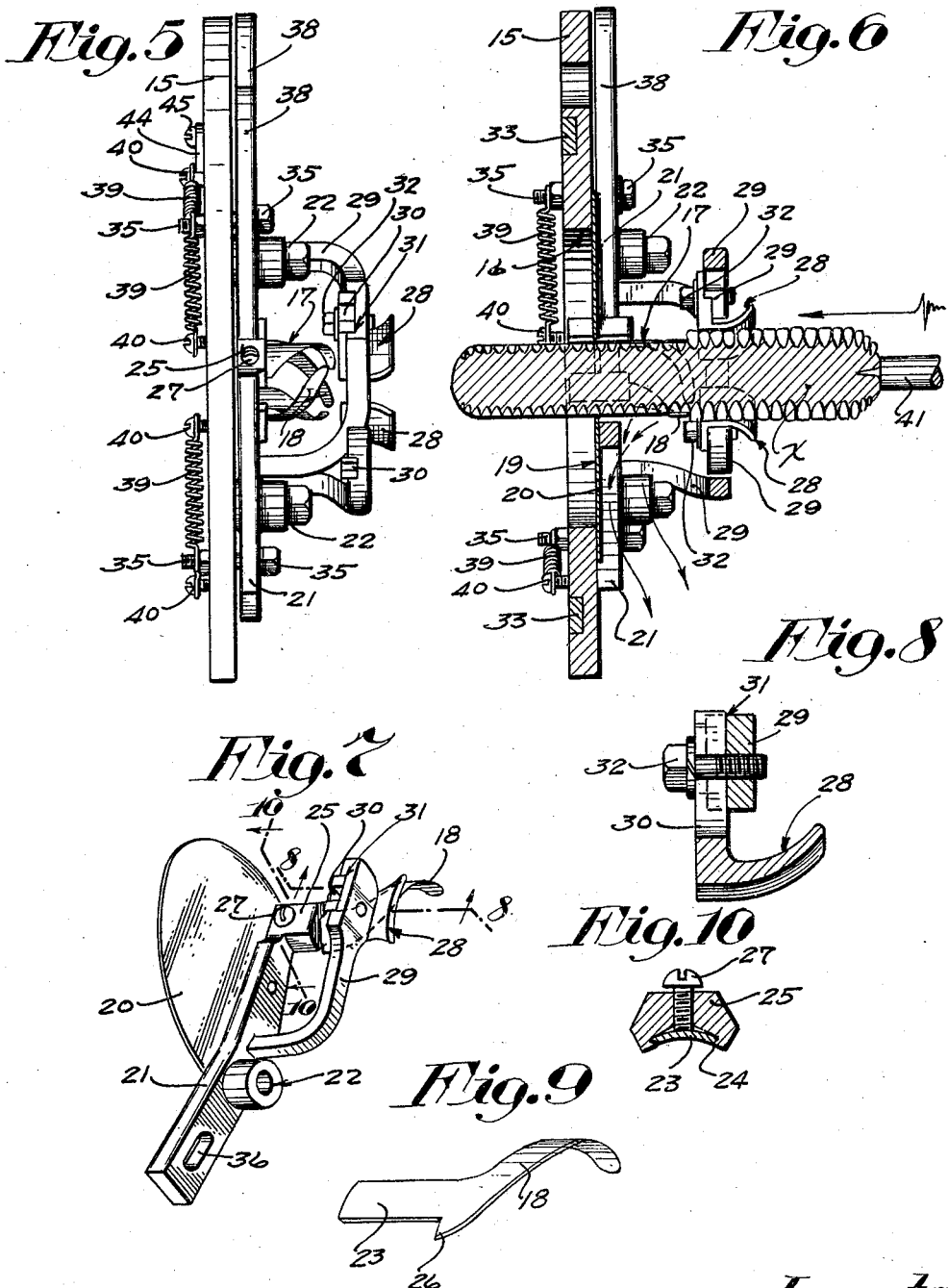

Oct. 20, 1931.   F. W. DOUTHITT   1,828,648
CUTTER HEAD FOR CORN CUTTING MACHINES
Filed Sept. 18, 1929   3 Sheets-Sheet 3

Inventor
Frank W. Douthitt
By his Attorneys
Merchant and Kilson

Patented Oct. 20, 1931

1,828,648

UNITED STATES PATENT OFFICE

FRANK W. DOUTHITT, OF ORTONVILLE, MINNESOTA

CUTTER HEAD FOR CORN CUTTING MACHINES

Application filed September 18, 1929. Serial No. 393,430.

My present invention has for its object the provision of a highly efficient cutter head for general use in connection with various different types of corn cutting machines for removing the kernels of green corn from their cobs.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the cutter head removed from a corn cutting machine, some parts shown in different positions by means of broken lines and further showing in section an ear of corn in said head;

Fig. 2 is a rear elevation of the parts shown in Fig. 1;

Fig. 3 is a detail view principally in section taken on the irregular line 3—3 of Fig. 2;

Fig. 4 is a detail view principally in section taken on the line 4—4 of Fig. 1;

Fig. 5 is a side elevation of the cutter head as shown in Fig. 1;

Fig. 6 is a view principally in central vertical section taken on the line 6—6 of Fig. 1;

Fig. 7 is a perspective view of one of the levers and the parts carried thereby, removed from the cutter head;

Fig. 8 is a detail view principally in section taken on the irregular line 8—8 of Fig. 7, on an enlarged scale;

Fig. 9 is a perspective view of one of the cutter blades removed from its lever;

Fig. 10 is a detail view principally in section taken on the irregular line 10—10 of Fig. 7, on an enlarged scale;

Figure 11:
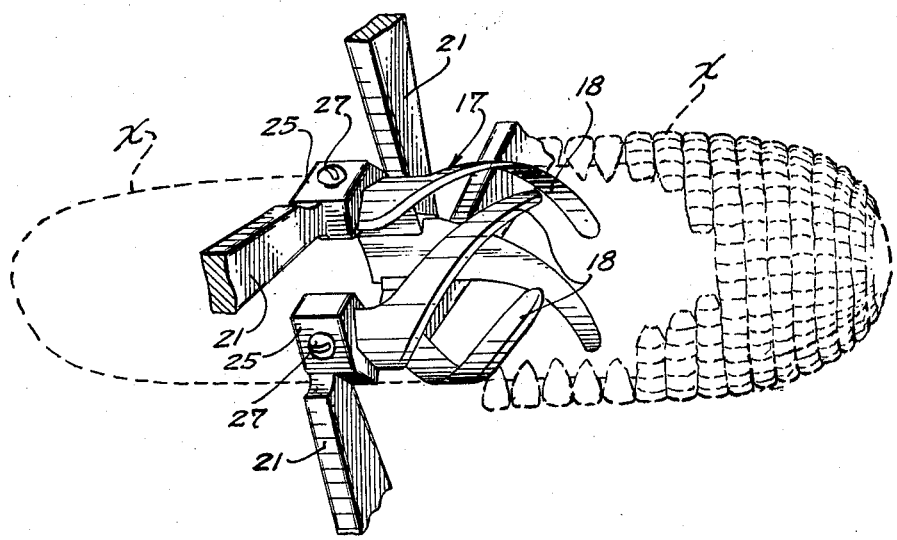
Fig. 11 is a fragmentary perspective view of the cutter, as shown in Fig. 2 but on an enlarged scale with the exception that the ear of corn is indicated by broken lines.
Figure 12:
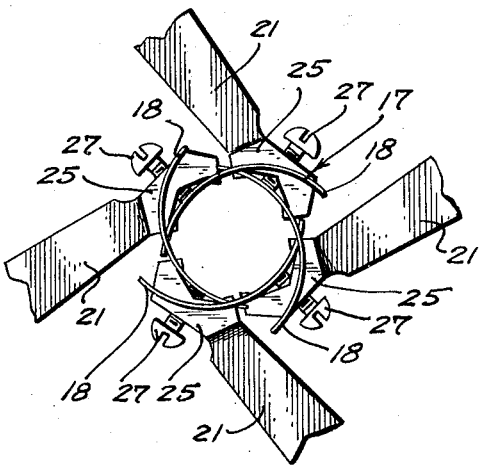
Fig. 12 is a plan view of the cutter, as shown in Fig. 1 with the exception that it is contracted to its smallest diameter.

The numeral 15 indicates an upright head plate having a round transverse feed passageway 16 and adapted to be mounted on a corn cutting machine, not shown. Axially aligned with the axis of the feed passageway 16, at the inner face of the head plate 15, is an iris-like cutter 17 comprising four blades 18 and an iris-like diaphragm 19 having a corresponding number of shutters 20. Said cutter blades 18 and shutters 20 are carried by four levers 21 intermediately pivoted through bossed openings at 22 to the head plate 15 on the inner face thereof for oscillatory movement in a plane parallel to said head plate. Each cutter blade 18 is flat in cross-section and formed with its heel is a wide shank 23. These cutter blades 18 are rigidly but detachably secured to the levers 21 by having their shanks 23 mounted in long seats 24 formed in wide heads 25 on the free ends of the inner arms of said levers and project into the passageway 16. Said shanks 23 having dove-tailed interlocking engagement with the seats 24 by endwise sliding movement. Stop shoulders 26, on the shanks 23, limit the movement of said shanks into their seats 24 and properly position the cutter blades 18. The shanks 23 are segmental in cross-section and their backs are out of contact with the bottoms of the seats 24 so that only the longitudinal edge portions of said shanks contact with the seats 24 to reduce friction and thereby facilitate the movement of the shanks 23 into and out of their seats 24.

Set-screws 27 having threaded engagement with the heads 25 from the backs thereof, impinge against the shanks 23 and rigidly hold the same in their seats 24. The inner bosses on the levers 21 at their pivotal supports 20 are relatively short, contact with the head plate 15 and hold said levers out of engagement therewith for free swinging movements. The pivotal connections 22 of the levers 21 are circumferentially spaced equidistances about the feed passageway 16 and are located the same distance from the axis thereof. Each cutter blade 18 is relatively long, extends spirally from its shanks in the arc of a circle. The cutter blades 18 are circumferentially spaced in tubular formation about the axis of the feed passageway 16. The curvature of the cutter blades 18 is such that when said blades are set to cut the kernels from an average sized ear of corn they are substantially concentric to the feed passageway 16. These cutter blades 18, when set for cutting the kernels from small or large ears of corn, are eccentric to the feed passageway 16. The cutting edges on the blades 18 are formed by grinding the same from the outer faces thereof so that said cutting edges are in the planes of the inner faces of said blades and will thereby cut the kernels of corn close to the cob. These cutting edges of the blades 18 extend the full length thereof and the cutting edge of one blade extends under the back of the adjacent blade 18. The cutter blades 18 by their tubular and spiral formation form a continuous series of overlapping spiral cutting edges. When the cutter 17 is contracted to its smallest diameter, the free end portions of its cutter blades 18 extend outward of the tubular formation thereof so that the cutting of the kernels of corn from the cob is performed only by the heel portions of said blades. As the cutter 17 is expanded, the free end portions of its cutter blades 18 are progressively drawn into the tubular formation for cutting action.

The pitch of the long spiral cutting edges of the cutter blades 18 is such as to cause said blades to produce a drawing cutting action that removes the kernels of corn from the cob with a clean cut and this formation of the cutter 17 is such as to require a relatively light pressure to feed the ear of corn therethrough.

The purpose of the iris-like diaphragm 19 is to prevent the kernels of corn from following the cob as they are cut therefrom thus avoiding waste. The diaphragm 19 substantially closes the feed passageway 16 outward of the tubular formation produced by the active portions of the cutter blades 18. The diaphragm shutters 20, as shown, are in the form of flat plates riveted to the inner arms of the levers 21 at the inner faces thereof and work close to the adjacent face of the head plate 15. The mounting of the shutters 20, on the levers 21, is such that they pass over one another during the contracting and expanding movements of the diaphragm 19. The free radial edge portions of the shutters 20 are rolled away from the shutters over which they overlap to prevent striking, see Fig. 4.

Cooperating with the cutter 17 is an iris-like depth gauge 28 that is automatically controlled by an ear of corn passing therethrough to said cutter. This depth gauge 28 comprises four circumferentially spaced segmental sections, the receiving ends of which are flared to faciltate the feeding of an ear of corn thereto. These sections, of the depth gauge 28, are individually carried by curved secondary arms 29 integrally formed with the inner arms of the levers 21. Said secondary arms 29 hold the depth gauge 28 axially aligned with the cutter 17 and axially spaced therefrom. This depth gauge 28, by its engagement with an ear of corn being fed axially therethrough, holds the levers 21 with the cutter blades 18 expanded to a diameter to cut the kernels of corn from the ear at a predetermined depth.

To vary the depth of the cut made by the cutter 17 the sections of the depth gauge 28 are mounted on the secondary arms 29 for radial adjustment. The adjustable connections between the sections of the depth gauge 28 and secondary arms 29 include radially extended bifurcated extensions 30 integrally formed with said sections, slidably mounted in channel seats 31 in said arms and secured therein by binding screws 32. These binding screws 32 extend between the prongs of the gauge extensions 30, have screw-threaded engagement with the secondary arms 29 and their heads impinge against said extensions to frictionally clamp the same in the seats 31 and hold the same where set.

The levers 21 are connected for simultaneous movement by an annular shift ring 33 mounted in an annular channel 34 in the outer face of the head plate 15, and to which they are connected by bolts 35. These bolts 35 extend through short, longitudinally extended slots 36 in the outer arms of the levers 21, through circumferentially extended slots 37 in the head plate 15 and holes in the shift ring 33. Said bolts 35 are rigidly secured in perpendicular positions to the shift ring 33 by shoulders formed therein and nuts having threaded engagement with said bolts frictionally clamp said shoulders onto the shift ring 33. Hand levers 38 forming extensions of the two upper levers 21 afford means by which either of said levers may be manually manipulated to expand the cutter 17, diaphragm 19 and depth gauge 28.

Four stiff coiled springs 39 are anchored to the head plate 15 by screws 40 and attached one to each of the bolts 35. Said screws 40 are circumferentially spaced equi-distances apart and have threaded engagement with the head plate 15 close to the inner wall of the channel 34. The springs 39 are under strain to turn the shift ring 33 in the direction of the arrow marked thereon in Fig. 1 to simultaneously operate the levers 21 and contract the cutter 17, diaphragm 19 and gauge 28. The springs 39, of course, will yield and permit a backward movement to the shift ring 33 when the levers 21 are moved by the action of an ear of corn X passing through the depth gauge 28 during its feeding movement to the cutter 17.

For the purpose of this case it is not thought necessary to show the mechanism for feeding an ear of corn through the cutter head with the exception of the power operated reciprocating plunger 41, as shown in Fig. 6. It is neither thought necessary to show the grippers for holding an ear of corn aligned with the cutter head and positioned to be engaged by the plunger 41. During the feeding movement of the rear of corn X into the gauge 28 by the plunger 41, said gauge is expanded and thereby automatically positions the cutter blades 18 for action to cut the kernels of corn from the cob at the desired depth and also simultaneously operates the diaphragm 19 to close the feed passageway 16 and prevent the kernels from following the cob therethrough.

The extreme contracting movement of the cutter 17 is limited by the engagement of the heads 25, the one with the other in circumferentially spaced arrangement about the axis of the cutter 17. To limit the contracting movement of the cutter 17 there is provided an eccentric 42 secured to the head plate 15 by nut-equipped bolts 43 in different circumferentially set positions and arranged to be engaged by the upper right-hand lever 21, as shown in Fig. 2.

The purpose of limiting the contracting movement of the cutter 17 is to prevent unnecessary movements thereof when cutting the kernels from large ears of corn, for instance, in the early part of the season when the ears are small and eccentric 42 may be adjusted to permit the cutter blades 18 to contract to a small diameter, but as the season advances and the ears of corn increase in size the eccentric 42 may be adjusted to limit this contracting movement of the cutter 17. During the adjustment of the eccentric 42, the cutter 17 may be expanded to the desired diameter by manipulating one of the hand levers 38.

A lock is provided for holding the shift ring 33 with the cutter 17, diaphragm 19 and depth gauge 28 expanded to substantially their greatest diameter. This lock, as shown, is in the form of an arm 44 pivoted at 45 to the head plate 15 and having a lock notch 46 and a stop finger 47, at its free end, arranged to be engaged by one of the bolts 35. Normally this lock arm 43 rests on the respective bolt 35, as shown in Fig. 1 to permit free oscillatory movement of the shift ring 33. To lock the shift ring 33 with the cutter 17 expanded to substantially its greatest diameter, the operator manipulates one of the hand levers 38 to retract said shift ring a distance sufficient to permit the lock arm 44 to drop by gravity until stopped by the engagement of its fingers 47 with the respective bolt 35 and thereby position the lock notch 46 to receive said bolt, as shown by dotted lines in Fig. 1.

As the cutter blades are made from spring steel, their free end portions which are unsupported will yield on substantially radial lines that extend from the axis of the cutter and hence closely hug the irregular periphery of a cob and remove therefrom all of the kernels.

What I claim is:

1. A cutter head for a corn cutting machine comprising a supporting plate having a central opening therethrough, a series of levers pivotally attached to the front face of said supporting plate and movable in a plane parallel with the face of said plate, each lever at its inner end having a seat for a cutting blade, a cutting blade having a supporting tang attached to the seat of each lever, said blades extending spirally from the supporting tang and forming a series of overlapping spiral cutting edges, said levers having arms thereon projecting in front of the cutting blade, a depth gauge supported on each arm, said supporting plate having a channel in the rear face thereof concentric to the center of the opening through the plate and having slots through the plate in alinement with said channel, a ring located in said channel, devices carried by the ring and extending through said slots and connected to said levers, and yielding means connected to said ring and to said plate at the rear thereof for normally holding said levers with the cutting blades in contracted position.

2. A cutter head for a corn cutting machine comprising a supporting plate having a central opening therethrough, a series of levers pivotally attached to the front face of said supporting plate and movable in a plane parallel with the face of said plate, each lever at its inner end having a seat for a cutting blade, a cutting blade having a supporting tang attached to the seat of each lever, said blades extending spirally from the supporting tang and forming a series of overlapping spiral cutting edges, said levers having arms thereon projecting in front of the cutting blade, a depth gauge supported on each arm, said supporting plate having a channel in the rear face thereof concentric to the center of the opening through the plate and having slots through the plate in alinement with said channel, a ring located in said channel, devices carried by the ring and extending through said slots and connected to said levers, yielding means connected to said ring and to said plate at the rear thereof for normally holding said levers with the cutting blades in contracted position, and diaphragms carried by said levers for maintaining the opening through said plate closed outward of the cutting blades.

3. A cutter head for a corn cutting machine comprising a supporting plate having a central opening therethrough, a series of levers pivotally attached to the front face of said supporting plate and movable in a plane parallel with the face of said plate, each lever at its inner end having a seat for a cutting blade, a cutting blade having a supporting tang attached to the seat of each lever, said blades extending spirally from the supporting tang and forming a series of overlapping spiral cutting edges, said levers having arms thereon projecting in front of the cutting blade, a depth gauge supported on each arm, said supporting plate having a channel in the rear face thereof concentric to the center of the opening through the plate and having slots through the plate in alinement with said channel, a ring located in said channel, devices carried by the ring and extending through said slots and connected to said levers, yielding means connected to said ring and to said plate at the rear thereof for normally holding said levers with the cutting blades in contracted position, and means carried by said plate for holding said ring in a set position with the cutting blades moved outward to an extended position.

4. A cutter head for a corn cutting machine comprising a supporting plate having a central opening therethrough, a series of levers pivotally attached to the front face of said supporting plate and movable in a plane parallel with the face of said plate, each lever at its inner end having a seat for a cutting blade, a cutting blade having a supporting tang attached to the seat of each lever, said blades extending spirally from the supporting tang and forming a series of overlapping spiral cutting edges, said levers having arms thereon projecting in front of the cutting blade, a depth gauge supported on each arm, said supporting plate having a channel in the rear face thereof concentric to the center of the opening through the plate and having slots through the plate in alinement with said channel, a ring located in said channel, devices carried by the ring and extending through said slots and connected to said levers, yielding means connected to said ring and to said plate at the rear thereof for normally holding said levers with the cutting blades in contracted position, and an adjustable means carried by said plate and adapted to limit the movement of the blades inwardly to contracted position.

In testimony whereof I affix my signature.

FRANK W. DOUTHITT.